(12) United States Patent
Wakabayashi et al.

(10) Patent No.: US 11,537,032 B2
(45) Date of Patent: Dec. 27, 2022

(54) OPTICAL PATH SHIFTING DEVICE, IMAGE DISPLAY DEVICE, AND METHOD FOR CONTROLLING OPTICAL PATH SHIFTING DEVICE

(71) Applicant: SEIKO EPSON CORPORATION, Tokyo (JP)

(72) Inventors: Shinichi Wakabayashi, Suwa (JP); Akira Nemura, Azumino (JP); Takao Hirakura, Matsumoto (JP); Daisuke Yanagihara, Matsumoto (JP); Nozomi Fujishige, Kitaazumi-gun (JP); Kazunori Maeta, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 499 days.

(21) Appl. No.: 16/683,334

(22) Filed: Nov. 14, 2019

(65) Prior Publication Data

US 2020/0159093 A1 May 21, 2020

(30) Foreign Application Priority Data

Nov. 15, 2018 (JP) .............................. JP2018-214423

(51) Int. Cl.
*G03B 21/14* (2006.01)
*G01D 5/14* (2006.01)

(52) U.S. Cl.
CPC .......... *G03B 21/142* (2013.01); *G01D 5/145* (2013.01)

(58) Field of Classification Search
CPC ................................ G03B 21/142; G01D 5/145
See application file for complete search history.

(56) References Cited

U.S. PATENT DOCUMENTS

| 5,343,146 A * | 8/1994 | Koch ................... G01B 7/105 |
| | | 324/230 |
| 2007/0076171 A1* | 4/2007 | Fasen ....................... H04N 5/74 |
| | | 353/30 |
| 2015/0264291 A1 | 9/2015 | Tani et al. |
| 2015/0277104 A1 | 10/2015 | Hino |

(Continued)

FOREIGN PATENT DOCUMENTS

| JP | 2012-202741 A | 10/2012 |
| JP | 2015-187678 A | 10/2015 |
| JP | 2015-194721 A | 11/2015 |

(Continued)

*Primary Examiner* — Clayton E. LaBalle
*Assistant Examiner* — Michael A Harrison
(74) *Attorney, Agent, or Firm* — Dority & Manning, P.A.

(57) ABSTRACT

An optical path shifting device includes: a holding frame holding a rectangular glass plate; a support part supporting the holding frame in a swingable state; an actuator causing the holding frame to swing; a magnetic sensor detecting a position of the holding frame; and a thermistor detecting a temperature of the magnetic sensor. A drive signal processing circuit includes: an amplifier amplifying a reference signal to generate a drive signal and supplying the drive signal to the actuator; and a signal processing unit inputting the reference signal and an amplifier gain to the amplifier. The signal processing unit performs gain adjustment processing to correct an amplitude value found from an output from the magnetic sensor, based on an output from the thermistor, and to adjust the amplifier gain, based on a corrected value.

6 Claims, 13 Drawing Sheets

(56) References Cited

U.S. PATENT DOCUMENTS

2016/0124216 A1    5/2016  Kojima et al.
2016/0227176 A1    8/2016  Mizoguchi

FOREIGN PATENT DOCUMENTS

| JP | 2016-090752 A | 5/2016 |
| JP | 2016-118603 A | 6/2016 |
| JP | 2016-142863 A | 8/2016 |

\* cited by examiner

FIG. 4
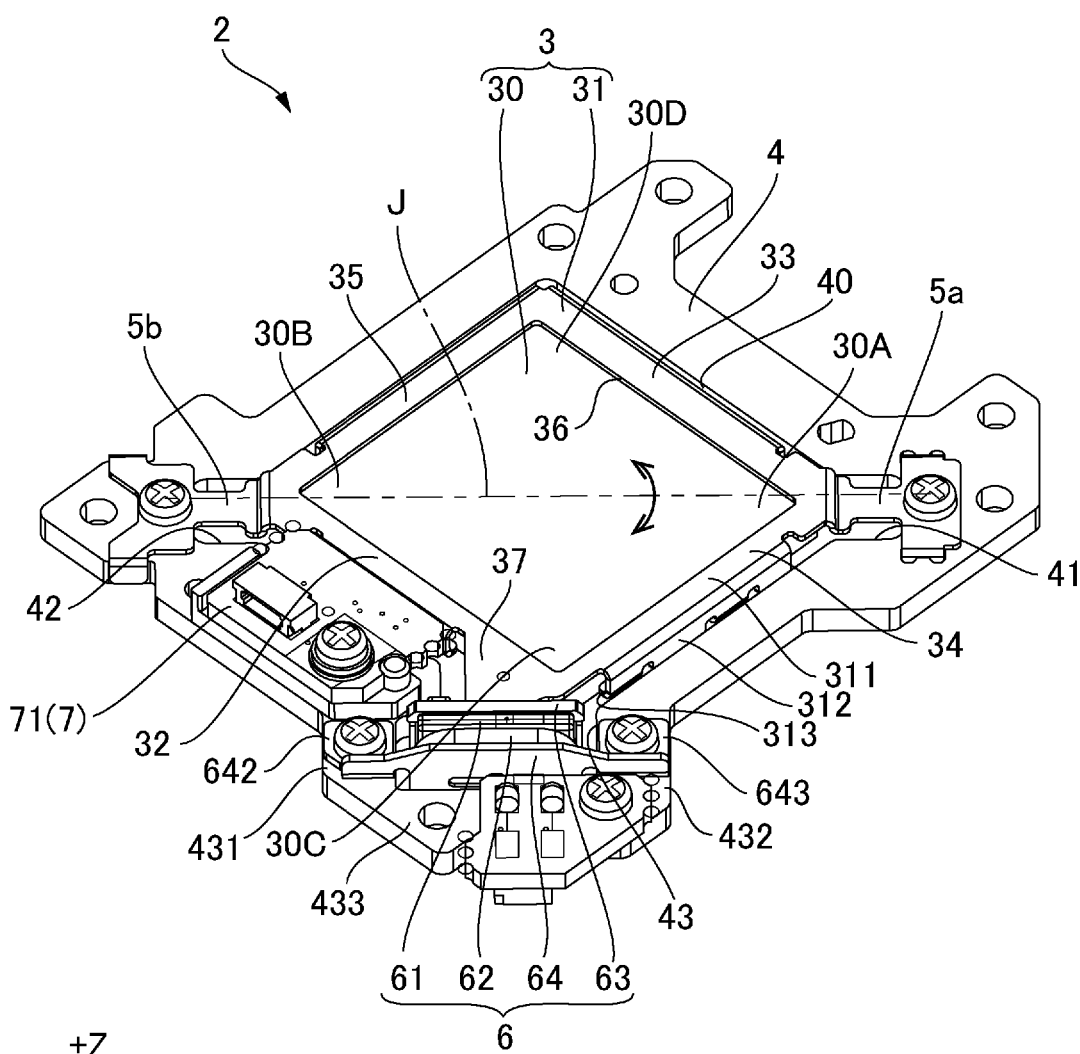
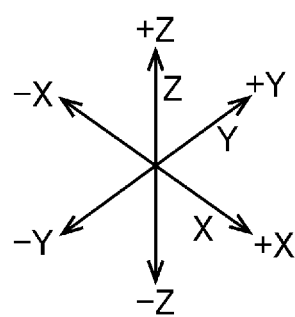

FIG. 13

| CHARACTERISTIC ITEM | UNIT | NEODYMIUM MAGNET | SAMARIUM-COBALT MAGNET | FERRITE MAGNET | ALNICO MAGNET |
|---|---|---|---|---|---|
| TEMPERATURE COEFFICIENT (Br) | %/°C | −0.12 | −0.03 | −0.18 | −0.02 |
| TEMPERATURE COEFFICIENT (Hcj) | %/°C | −0.55 | −0.15 | 0.2 | − |

OPTICAL PATH SHIFTING DEVICE, IMAGE DISPLAY DEVICE, AND METHOD FOR CONTROLLING OPTICAL PATH SHIFTING DEVICE

The present application is based on, and claims priority from JP Application Serial Number 2018-214423, filed Nov. 15, 2018, the disclosure of which is hereby incorporated by reference herein in its entirety.

BACKGROUND

1. Technical Field

The present disclosure relates to an optical path shifting device, an image display device, and a method for controlling an optical path shifting device.

2. Related Art

JP-A-2016-142863 discloses an image display device having an optical path shifting device which shifts the optical path of image light emitted from a light modulation device such as a liquid crystal panel. The image display device of JP-A-2016-142863 uses the optical path shifting device in order to make the resolution of a projected image higher than the resolution of the light modulation device. The optical path shifting device or optical device of JP-A-2016-142863 has a glass plate, a moving part having a holding member holding the glass plate, a support part supporting the moving part, a pair of shaft parts coupling the moving part and the support part together, and a drive mechanism causing the moving part to swing. The optical path shifting device of JP-A-2016-142863 causes the holding member to swing about a swing axis passing through the pair of shaft parts and thus changes the attitude of the glass plate. Thus, the optical path shifting device can refract the image light incident on the glass plate and shift the optical path.

The optical path shifting device of JP-A-2016-142863 uses a vibration actuator having a coil and a permanent magnet, as the drive mechanism causing the moving part to swing. The vibration actuator has a permanent magnet fixed to an edge of a frame-like holding member, and a pair of coils facing the permanent magnet from both sides in a normal direction to the glass plate. The permanent magnet and the coils are arranged at a distance such that the permanent magnet and the coils do not collide with each other when the moving part swings. The vibration actuator is arranged at two positions sandwiching the moving part. Each vibration actuator applies an alternating voltage to the pair of coils, thus causes a magnetic field generated by the coils to move the permanent magnet, and causes the moving part to swing.

The optical path shifting device causing the glass plate to swing and thus shifting the optical path needs to drive the glass plate accurately in order to shift the optical path accurately. However, in the optical path shifting device, the amplitude of the glass plate may change due to the environment of use and attitude. For example, when a mechanical component forming the optical path shifting device expands or contracts due to the environment of use, or when the actuator and the drive circuit are affected by the ambient temperature, the stability of the optical path shifting operation may be impaired.

SUMMARY

An optical path shifting device according to an aspect of the present disclosure includes: an optical member having a shape of a rectangular plate and on which incident light is incident; a holding frame holding the optical member; a support part supporting the holding frame in a swingable state; an actuator causing the holding frame to swing; and a magnetic sensor detecting a position of the holding frame.

An image display device according to another aspect of the present disclosure includes the foregoing optical path shifting device. The actuator is driven to change an optical path of image light.

A method for controlling the optical path shifting device according to still another aspect of the present disclosure includes: inputting a reference signal to an amplifier and supplying a drive signal outputted from the amplifier, to the actuator; correcting an amplitude value of the holding frame found from an output from the magnetic sensor, using an output from a temperature detection unit; and adjusting an amplifier gain used to generate the drive signal, based on a difference between a corrected value of the amplitude value and a reference amplitude value.

BRIEF DESCRIPTION OF THE DRAWINGS

FIG. 4 is a perspective view of an optical path shifting device according to the embodiment.

FIG. 13 is a table showing temperature characteristic values of magnets.

DESCRIPTION OF EXEMPLARY EMBODIMENTS

An illustrative embodiment of the present disclosure will now be described with reference to the drawings. In this specification, for the sake of convenience of the description, an X-axis, a Y-axis, and a Z-axis are shown as three axes orthogonal to each other. One direction along the X-axis is defined as a +X direction, and the other direction is defined as a −X direction. One direction along the Y-axis is defined as a +Y direction, and other direction is defined as a −Y direction. One direction along the Z-axis is defined as a +Z direction, and the other direction is defined as a −Z direction.

Projector (Image Display Device)

Figure 1:
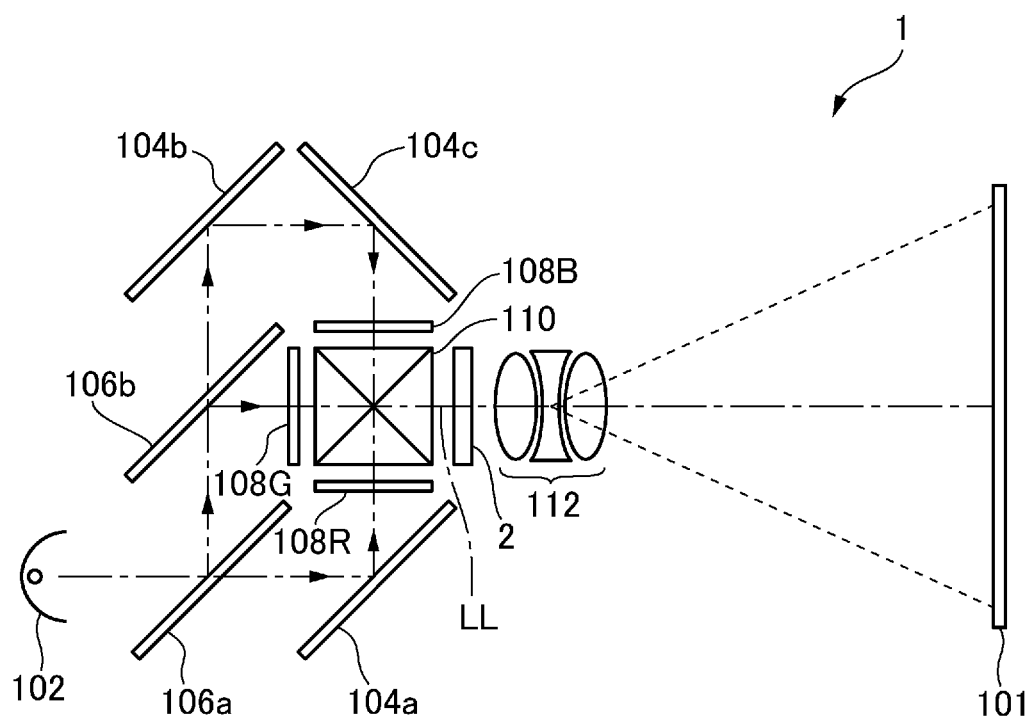
FIG. 1 is an explanatory view showing the optical configuration of a projector, which is an example of an image display device according to an embodiment.

FIG. 1 is an explanatory view showing an optical configuration of a projector, which is an example of an image display device according to this embodiment. A projector 1 shown in FIG. 1 is an LCD projector. The projector 1 is a device which displays an image on a screen 101, based on an image signal inputted from outside. The projector 1 has a light source 102, mirrors 104a, 104b, 104c, dichroic mirrors 106a, 106b, liquid crystal display elements 108R, 108G, 108B, a dichroic prism 110, an optical path shifting device 2, and a projection system 112.

The light source 102 is, for example, a halogen lamp, mercury lamp, light-emitting diode (LED), laser light source, and the like. Also, a light source that emits white light is used as the light source 102. The light emitted from the light source 102 is separated into red light (R) and the other light, for example, by the dichroic mirror 106a. The red light is reflected by the mirror 104a and subsequently becomes incident on the liquid crystal display element 108R. The other light is further separated into greed light (G) and blue light (B) by the dichroic mirror 106b. The green light is incident on the liquid crystal display element 108G. The blue light is reflected by the mirrors 104b, 104c and subsequently becomes incident on the liquid crystal display element 108B.

Each of the liquid crystal display elements 108R, 108G, 108B is used as a spatial light modulator. The liquid crystal display elements 108R, 108G, 108B are transmission-type spatial light modulators corresponding to the primary colors of R, G, and B, respectively, and have pixels arranged, for example, in the form of a matrix with 1080 pixels in height by 1920 pixels in width. At each pixel, the amount of light of transmitted light in comparison with the incident light is adjusted. In each of the liquid crystal display elements 108R, 108G, 108B, the distribution of the amount of light over all the pixels is controlled in a coordinated manner. The light spatially modulated by the liquid crystal display elements 108R, 108G, 108B is combined together by the dichroic prism 110. Thus, full-color image light LL is emitted from the dichroic prism 110. The emitted image light LL is enlarged and projected onto the screen 101 by the projection system 112.

The optical path shifting device 2 is arranged between the dichroic prism 110 and the projection system 112. The projector 1 shifts the optical path of the image light LL by the optical path shifting device 2, that is, performs so-called "pixel shifting", and thus displays an image with a higher resolution than the resolution of the liquid crystal display elements 108R, 108G, 108B, onto the screen 101. For example, when the liquid crystal display elements 108R, 108G, 108B are of full high definition, the projector 1 displays a 4K image.

Figure 2:
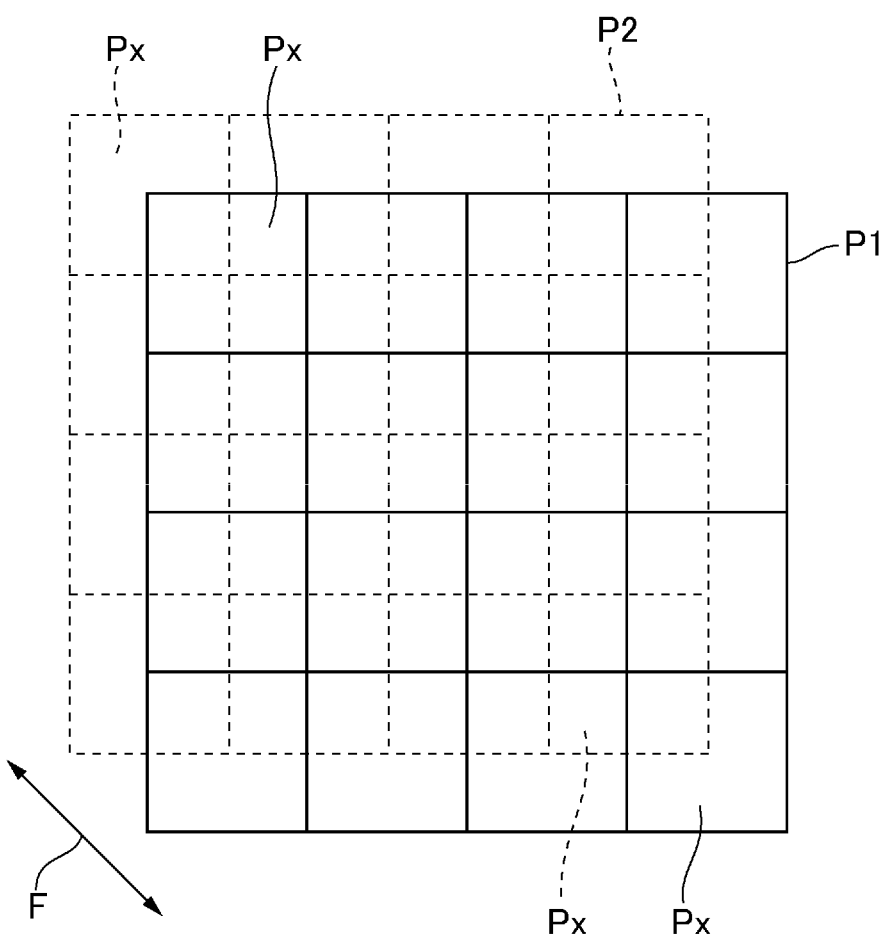
FIG. 2 is an explanatory view showing a shift in an image display position by shifting the optical path of image light.

The principle of resolution enhancement by shifting the optical path will now be briefly described with reference to FIG. 2. FIG. 2 is an explanatory view showing a shift in the image display position by shifting the optical path of image light. As will be described later, the optical path shifting device 2 has a glass plate 30, which is a light-transmissive substrate transmitting the image light LL. The optical path shifting device 2 changes the attitude of the glass plate 30 and thus shifts the optical path of the image light LL, using refraction. Using such shifting of the optical path, the projector 1 displays an image alternately at an image display position P1 resulting from shifting the optical path of the image light LL to one side and at an image display position P2 resulting from shifting the optical path of the image light LL to the other side. The image display positions P1, P2 are positions shifted by half a pixel in a diagonal direction F of a pixel Px on the screen 101, that is, by half the pixel Px. Such pixel shifting increases apparent pixels and thus enables resolution enhancement of the image projected on the screen 101. The amount of shift of the image display positions P1, P2 is not limited to half a pixel and may be, for example, ¼ or ¾ of the pixel Px.

Figure 3:
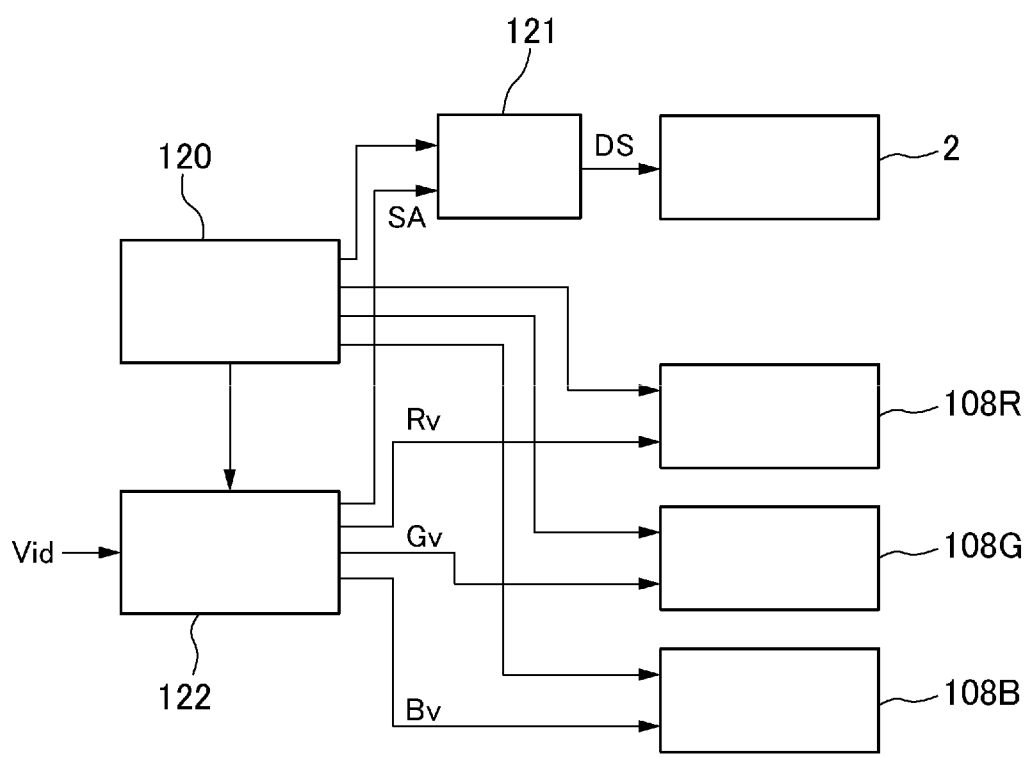
FIG. 3 is a block diagram showing the electrical configuration of the projector in FIG. 1.

FIG. 3 is a block diagram showing the electrical configuration of the projector 1 in FIG. 1. The projector 1 has a control circuit 120, a drive signal processing circuit 121, and an image signal processing circuit 122. The control circuit 120 controls a data signal writing operation to the liquid crystal display elements 108R, 108G, 108B, an optical path shifting operation in the optical path shifting device 2, and a data signal generation operation in the image signal processing circuit 122, or the like. The drive signal processing circuit 121 supplies a drive signal DS to drive the optical path shifting device 2, based on a synchronization signal SA outputted from the image signal processing circuit 122.

The image signal processing circuit 122 separates an image signal Vid supplied from an external device, not illustrated, into the primary colors of R, G, B, and converts the image signal Vid into data signals Rv, Gv, By suitable for the operation of the respective liquid crystal display elements 108R, 108G, 108B. The converted data signals Rv, Gv, By are supplied to the liquid crystal display elements 108R, 108G, 108B, respectively. The liquid crystal display elements 108R, 108G, 108B operate, based on the data signals Rv, Gv, By.

Optical Path Shifting Device

Figure 5:
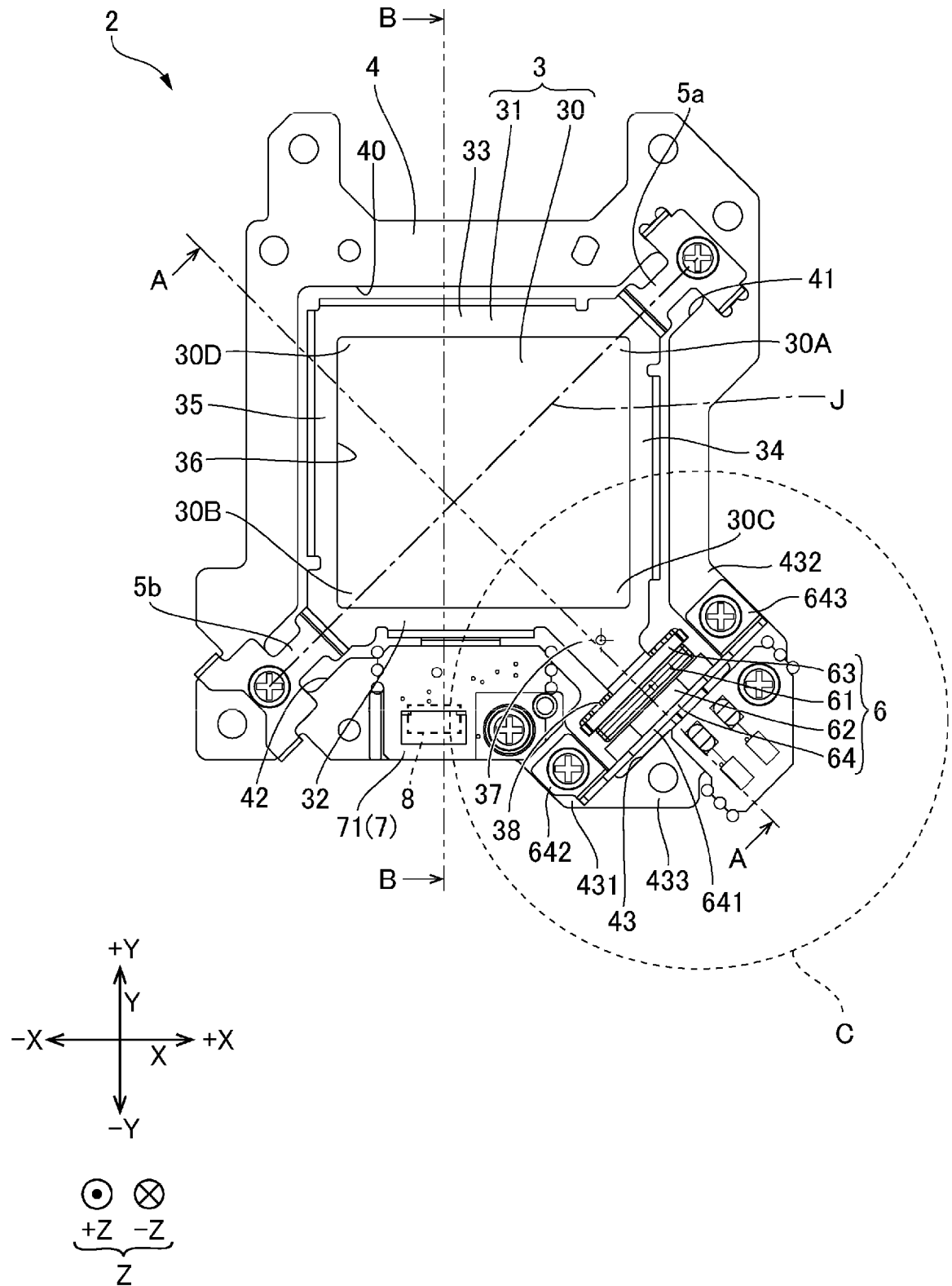
FIG. 5 is a plan view of the optical path shifting device in FIG. 4.

FIG. 4 is a perspective view of the optical path shifting device 2 according to the embodiment. The optical path shifting device 2 is used to shift the optical path of the image light LL in the projector 1 in FIG. 1. FIG. 5 is a plan view of the optical path shifting device 2 in FIG. 4. The optical path shifting device 2 has a rectangular moving part 3, a frame-like support part 4 surrounding the moving part 3, a first shaft part 5a and a second shaft part 5b coupling the moving part 3 and the support part 4 together, an actuator 6 causing the moving part 3 to swing about a swing axis J passing through the first shaft part 5a and the second shaft part 5b, a magnetic sensor 7 detecting the position of the moving part 3, and a thermistor 8 detecting the temperature of the magnetic sensor 7, shown in FIGS. 5 and 7.

The moving part 3 has the glass plate 30 as an optical member which is light-transmissive and on which the image light LL is incident, and a holding frame 31 holding the glass plate 30. When the moving part 3 is in a position where the angle of incidence of the image light LL to the glass plate 30 is 0°, which is hereinafter referred to as a reference position, the normal direction to the glass plate 30 coincides with the Z-axis. The optical path shifting device 2 is arranged in the projector 1, for example, in such a way that the +Z side of the optical path shifting device 2 faces the dichroic prism 110 and that the −Z side faces the projection system 112. The direction of the optical path shifting device 2 along the Z-axis may be the opposite of this.

The holding frame 31 is a rectangular frame-like member having a first frame part 32 and a second frame part 33 extending substantially parallel to the X-axis and a third frame part 34 and a fourth frame part 35 extending substantially parallel to the Y-axis. The holding frame 31 has a rectangular opening 36 surrounded by the first frame part 32, the second frame part 33, the third frame part 34, and the fourth frame part 35. The glass plate 30 is arranged in the opening 36. An outer circumferential end part of the glass plate 30 is held by the first frame part 32, the second frame part 33, the third frame part 34, and the fourth frame part 35. In this embodiment, the holding frame 31 is formed of a metal plate of stainless steel or the like.

Figure 6:
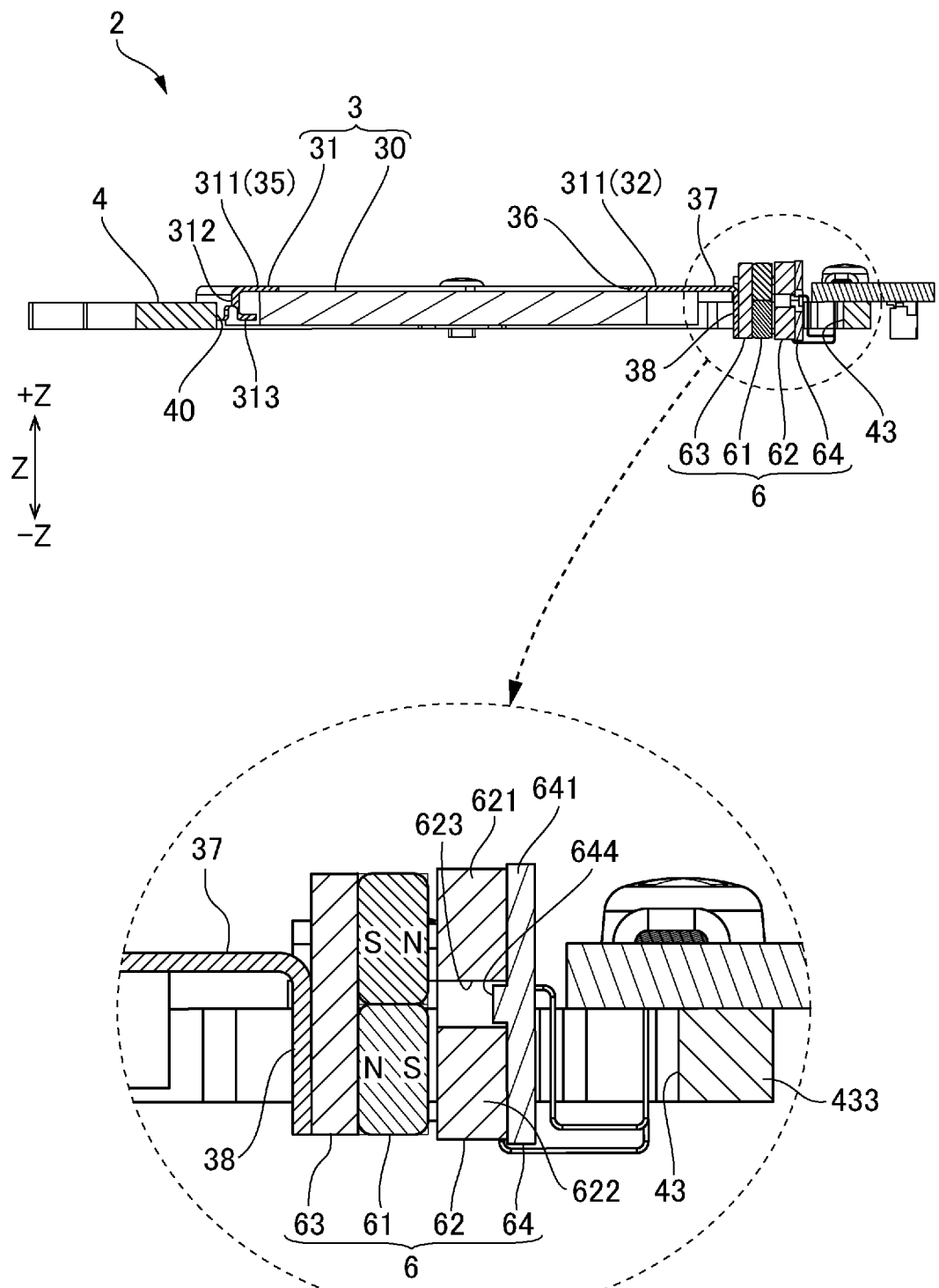
FIG. 6 shows a cross-sectional view of the optical path shifting device in FIG. 4 taken at the position of an actuator, that is, taken along A-A in FIG. 5, and a partly enlarged view thereof.
Figure 7:
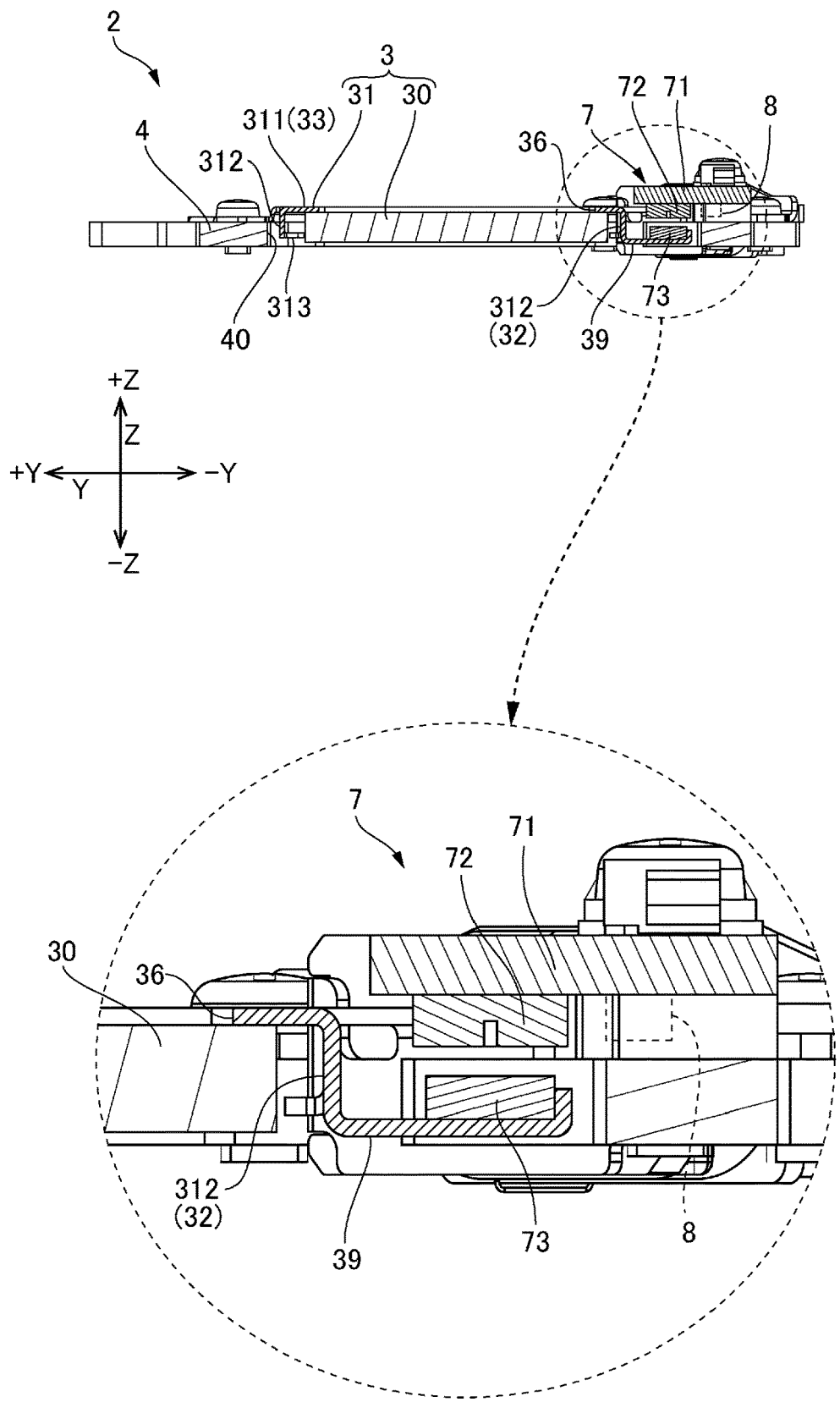
FIG. 7 shows a cross-sectional view of the optical path shifting device in FIG. 4 taken at the position of a magnetic sensor, that is, taken along B-B in FIG. 5, and a partly enlarged view thereof.

FIG. 6 shows a cross-sectional view of the optical path shifting device 2 in FIG. 4 taken at the position of the actuator 6, that is, taken along A-A in FIG. 5, and a partly enlarged view thereof. FIG. 7 shows a cross-sectional view of the optical path shifting device 2 in FIG. 4 taken at the position of the magnetic sensor 7, that is, taken along B-B in FIG. 5, and a partly enlarged view thereof. As shown in FIGS. 6 and 7, each of the first frame part 32, the second frame part 33, the third frame part 34, and the fourth frame part 35 has a front plate part 311 covering the surface on the +Z side of the outer circumferential end part of the glass plate 30, a side plate part 312 bending and extending in the −Z direction from an end part on the outer circumferential side of the front plate part 311, and a pawl part 313 protruding toward an end surface of the glass plate 30 from an end part in the −Z direction of the side plate part 312. The glass plate 30 is fixed to the holding frame 31 with an adhesive and via the pawl part 313. The holding frame 31 is a member of a bent structure formed of a bent metal plate. Therefore, the holding frame 31 can secure a required strength despite having a structure using a thin metal plate.

The glass plate 30 has a first corner part 30A and a second corner part 30B opposite each other, and a third corner part 30C and a fourth corner part 30D opposite each other in a direction intersecting a diagonal line connecting the first corner part 30A and the second corner part 30B. The first shaft part 5a and the second shaft part 5b are arranged on the diagonal line connecting the first corner part 30A and the second corner part 30B of the glass plate 30. The swing axis J passing through the first shaft part 5a and the second shaft part 5b extends in a direction along the diagonal line connecting the first corner part 30A and the second corner part 30B.

The first shaft part 5a and the second shaft part 5b are joined to the corner parts of the holding frame 31. In this embodiment, the first shaft part 5a, the second shaft part 5b, and the holding frame 31 are formed as a unified body.

The first shaft part 5a is arranged at a middle angle position between the +X direction and the +Y direction as viewed from the center of the glass plate 30. The second shaft part 5b is arranged at a middle angle position between the −X direction and the −Y direction as viewed from the center of the glass plate 30. The swing axis J passing through the first shaft part 5a and the second shaft part 5b is located within a plane substantially parallel to an XY plane and is tilted 450 from the X-axis and the Y-axis. Since the first shaft part 5a and the second shaft part 5b are arranged in point symmetry about the center of the glass plate 30, the moving part 3 has a good swing balance. Also, the tilt angle of the swing axis J from the X-axis and the Y-axis is not limited to 450°.

The support part 4 has a rectangular opening 40, where the holding frame 31 is arranged. At two corner parts on the swing axis J of an inner circumferential edge of the opening 40, a first recess part 41, where the first shaft part 5a is arranged, and a second recess part 42, where the second shaft part 5b is arranged, are provided. A distal end on the side opposite to the holding frame 31, of the first shaft part 5a, overlaps an edge of the first recess part 41 and is screwed to the support part 4. Similarly, a distal end on the side opposite to the holding frame 31, of the second shaft part 5b, overlaps an edge of the second recess part 42 and is screwed to the support part 4. The support part 4 supports the holding frame 31 in a swingable state about the swing axis J passing through the first shaft part 5a and the second shaft part 5b.

The image light LL is incident on the glass plate 30, for example, along the Z-axis. When the moving part 3 swings about the swing axis J, the angle of incidence of the image light LL on the glass plate 30 changes. As the angle of incidence of the image light LL on the glass plate 30 tilts from 0°, the incident image light LL is refracted and transmitted. Therefore, changing the attitude of the glass plate 30 in such a way as to achieve a target angle of incidence can control the direction of deflection and the amount of deflection of the image light LL. The size of such a glass plate 30 is properly set so as to transmit the image light LL emitted from the dichroic prism 110. Preferably, the glass plate 30 is substantially colorless and transparent. An antireflection coating may be formed at an image light LL incident surface and an image light LL exiting surface of the glass plate 30.

The constituent material of the glass plate 30 is not particularly limited. However, various glass materials such as white sheet glass, borosilicate glass, and quartz glass can be used. Although the glass plate 30 is used as the optical member in this embodiment, the optical member may be formed of any material that is light-transmissive and refracts the image light LL. That is, the optical member may be formed of, for example, various crystal materials such as quartz crystal and sapphire, or various resin materials such as polycarbonate-based resin and acryl-based resin, other than glass. However, using the glass plate 30 as the optical member as in this embodiment can particularly increase the rigidity of the optical member. Therefore, variation in the amount of shift of the optical path when shifting the optical path of the image light LL in the optical member can be restrained.

The holding frame 31, the support part 4, the first shaft part 5a, and the second shaft part 5b are formed of stainless steel or resin and therefore can reduce the influence of the ambient temperature. Thus, the optical path shifting device 2 which is small-sized and has a low resonance frequency can be provided. For example, the optical path shifting device 2 having a resonance frequency of approximately 60 kHz can be provided.

As shown in FIGS. 4 and 5, the actuator 6 is arranged at a position facing the third corner part 30C of the glass plate 30. As described above, the first shaft part 5a and the second shaft part 5b are arranged at positions facing the first corner part 30A and the second corner part 30B of the glass plate 30. Therefore, the actuator 6 is arranged at the most distant site from the swing axis J in the moving part 3. The actuator 6 has a permanent magnet 61 and a coil 62 facing each other.

As shown in FIGS. 4 and 5, the support part 4 is provided with a third recess part 43 at a position facing the third corner part 30C of the glass plate 30. The actuator 6 is arranged in the third recess part 43. The third recess part 43 is provided at a corner part of the opening 40 and is recessed in a direction tilted 450 from the +X direction and the −Y direction. The support part 4 has a first edge part 431, a second edge part 432, and a third edge part 433 surrounding the third recess part 43. The third edge part 433 surrounds the side opposite to the opening 40, of the third recess part 43. The first edge part 431 and the second edge part 432 extend toward the opening 40 from both ends of the third edge part 433. The first edge part 431 and the second edge part 432 extend substantially parallel to the direction tilted 450 from the +X direction and the −Y direction.

The holding frame 31 has an arm part 37 extending toward the third recess part 43 from a part on the side of the third corner part 30C, of the first frame part 32, and a drive magnet attachment part 38 provided at a distal end of the arm part 37. The arm part 37 protrudes from the first frame part 32 into the direction tilted 450 from the +X direction and the −Y direction. The drive magnet attachment part 38 bends and extends substantially at right angles into the −Z direction from the distal end of the arm part 37. The drive magnet attachment part 38 is a plate-like part extending substantially parallel to the swing axis J and the Z-axis and is greater than the arm part 37 in the width in the direction along the swing axis J.

In the actuator 6, the permanent magnet 61 is held by the holding frame 31 and the coil 62 is held by the support part 4. The actuator 6 has a magnet holding plate 63, to which the permanent magnet 61 is fixed. The magnet holding plate 63 is flat plate-shaped and fixed to the drive magnet attachment part 38. The permanent magnet 61 is fixed to the holding frame 31 via the magnet holding plate 63. The actuator 6 also has a coil holding plate 64 holding the coil 62. The coil 62 is fixed to the support part 4 via the coil holding plate 64.

Figure 8:
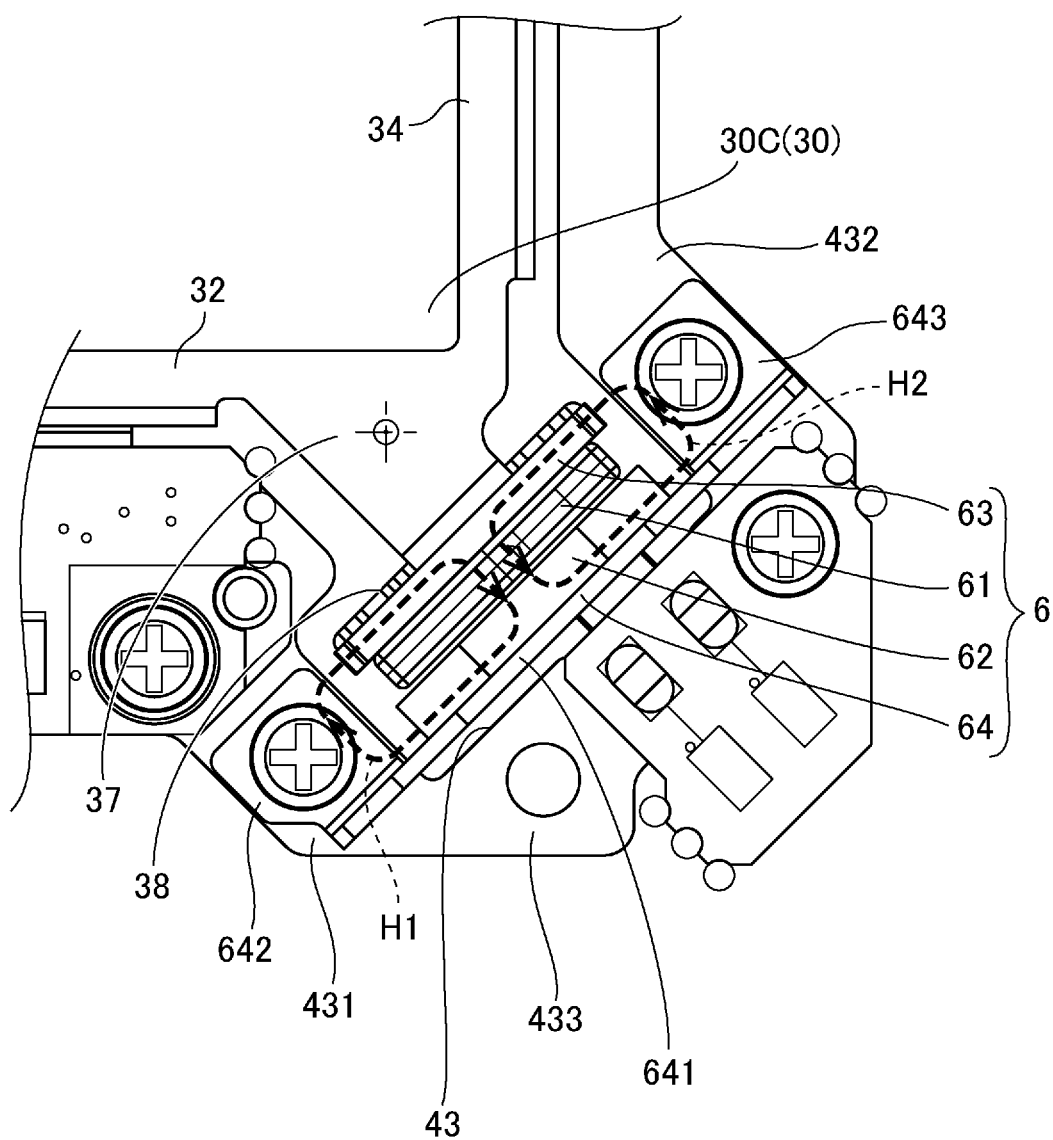
FIG. 8 is a plan view of the actuator and an enlarged view of an area C in FIG. 5.

The coil holding plate 64 has a plate-like base part 641, to which the coil 62 is fixed, and a first protruding part 642 and a second protruding part 643 protruding from the base part 641. The first protruding part 642 and the second protruding part 643 are provided on both sides of the part where the coil 62 is fixed, of the base part 641, and extend in a direction orthogonal to the surface where the coil 62 is fixed. The coil holding plate 64 is arranged at a position such that the coil 62 fixed to the base part 641 and the permanent magnet 61 fixed to the drive magnet attachment part 38 via the magnet holding plate 63 face each other with a predetermined gap. As shown in FIGS. 4, 5, and 8, on both sides of the third recess part 43, the first protruding part 642 is screwed to the first edge part 431, and the second protruding part 643 is screwed to the second edge part 432. The base part 641 is arranged in the third recess part 43 in such a way as to be substantially parallel to the drive magnet attachment part 38.

The permanent magnet 61 has a first opposing surface 610 provided with an S-pole and an N-pole. As the permanent magnet 61, for example, a neodymium magnet, samarium-cobalt magnet, ferrite magnet, alnico magnet or the like can be used. In this embodiment, the permanent magnet 61 is a neodymium magnet. The neodymium magnet can secure a necessary magnetic force despite being a small magnet and therefore can achieve a smaller size and lighter weight of the actuator 6. The coil 62 has a second opposing surface 620 facing the first opposing surface 610. The first opposing surface 610 and the second opposing surface 620 are parallel to each other. The term "parallel" in this case may not mean being completely parallel and allows a deviation from being completely parallel to such an extent that the functions of the actuator 6 can be achieved. The permanent magnet 61 and the coil 62 are arranged in such a way that the direction of the first opposing surface 610 and the second opposing surface 620 intersects the surface of the glass plate 30.

FIG. 8 is a plan view of the actuator and an enlarged view of an area C in FIG. 5. As shown in FIG. 8, in the actuator 6, the first protruding part 642 and the second protruding part 643 of the coil holding plate 64 are arranged on both sides of the permanent magnet 61 and the coil 62, and the permanent magnet 61 and the coil 62 are arranged in an area formed between the first protruding part 642 and the second protruding part 643. Also, the magnet holding plate 63 is arranged on the other side of the permanent magnet 61 from the coil 62, and the base part 641 is arranged on the other side of the coil 62 from the permanent magnet 61. The magnet holding plate 63 and the coil holding plate 64 are made of a metal such as iron and function as aback yoke. Therefore, closed magnetic paths H1, H2 heading from both ends of the magnet holding plate 63 toward the first protruding part 642 and the second protruding part 643 and then toward the base part 641 are formed around the permanent magnet 61 and the coil 62. This can make a magnetic flux from the permanent magnet 61 less likely to leak outside. Thus, magnetic flux leakage can be reduced and magnetic efficiency can be increased.

In this embodiment, the coil 62 is an oval air-core coil. As shown in FIG. 6, the coil 62 has two effective sides 621, 622 extending substantially parallel to the swing axis J. A center hole 623 of the coil 62 is provided between the effective sides 621, 622. At the base part 641, a protruding part 644 protruding toward the drive magnet attachment part 38 is formed by press work. The coil 62 is positioned to the base part 641 by having the protruding part 644 arranged in the center hole 623.

The permanent magnet 61 has magnetic poles formed on the first opposing surface 610 facing the coil 62. On the first opposing surface 610, the S-pole and the N-pole are arranged along the Z-axis. When the moving part 3 is located in the reference position, where the normal direction to the glass plate 30 is parallel to the Z-axis, that is, the angle of incidence of the image light LL on the glass plate 30 is 0°, one of the S-pole and the N-pole of the permanent magnet 61 faces the effective side 621 and the other faces the effective side 622 in the actuator 6.

When the coil 62 is electrically energized, a current flows in the opposite directions through the effective sides 621, 622. Therefore, the permanent magnet 61 moves in a direction along the second opposing surface 620. In this embodiment, the S-pole and the N-pole of the permanent magnet 61 are arrayed along the Z-axis and the effective sides 621, 622 are arranged along the Z-axis. Therefore, the actuator 6 can move the permanent magnet 61 in a direction along the Z-axis. Thus, the corner part of the holding frame 31 to which the permanent magnet 61 is fixed can be moved in a direction along the Z-axis. This causes the moving part 3 to swing about the swing axis J.

Magnetic Sensor

As shown in FIGS. 4 and 5, the magnetic sensor 7 is arranged between the actuator 6 and the second shaft part 5b. As shown in FIG. 7, the magnetic sensor 7 has a sensor substrate 71, a Hall sensor 72, and a magnet 73. The Hall sensor 72 is provided at the sensor substrate 71 and is fixed to the support part 4 via the sensor substrate 71. Meanwhile, the magnet 73 is fixed to the holding frame 31. The Hall sensor 72 and the magnet 73 are arranged at positions such that the distance between the magnet 73 and the Hall sensor 72 changes when the moving part 3 swings. The holding frame 31 has a sensor magnet attachment part 39 bending and extending into the −Y direction from an end part in the −Z direction of the side plate part 312 of the first frame part 32. The Hall sensor 72 fixed to the sensor substrate 71 and the magnet 73 fixed to the sensor magnet attachment part 39 face each other along the Z-axis.

The Hall sensor 72 outputs a voltage corresponding to the intensity of a magnetic field generated by the magnet 73. Therefore, the magnetic sensor 7 can measure the distance between the magnet 73 and the Hall sensor 72 in a contactless manner. In the optical path shifting device 2, the magnetic sensor 7 is arranged in such a way that the distance between the magnet 73 and the Hall sensor 72 changes when the moving part 3 swings. Therefore, based on an output from the Hall sensor 72, a displacement along the Z-axis of the holding frame 31 with the magnet 73 provided thereon can be measured in a contactless manner.

The thermistor 8 is a temperature detection unit detecting the temperature of the magnetic sensor 7. The thermistor 8 is arranged near the Hall sensor 72 and provided at the sensor substrate 71 similarly to the Hall sensor 72. Therefore, the thermistor 8 is fixed to the support part 4 via the sensor substrate 71. An output from the Hall sensor 72 and the thermistor 8 is inputted to the drive signal processing circuit 121.

Drive Control of Actuator

The optical path shifting device 2 performs an optical path shifting operation which causes the moving part 3 to swing or vibrate at a predetermined frequency, based on the drive signal DS supplied from the drive signal processing circuit 121 to the actuator 6. In the actuator 6, a current flows through the coil 62, based on the drive signal DS. This causes the moving part 3 to swing or vibrate with an amplitude and frequency corresponding to the drive signal DS. Thus, in the projector 1, the optical path of the image light LL changes with a constant amplitude and an image is displayed alternately at the image display positions P1, P2.

The drive signal processing circuit 121 controls the drive signal DS inputted to the actuator 6, based on the amplitude value of the moving part 3, that is, the holding frame 31, found from the output from the magnetic sensor 7, when performing the optical path shifting operation, and thus performs feedback control to cause the moving part 3 to vibrate with a constant amplitude. Thus, the optical path of the image light LL is changed with a constant amplitude and an image is displayed alternately at the image display positions P1, P2. In the feedback control, the amplitude value found from the output from the magnetic sensor 7 is corrected, based on the output from the thermistor 8.

Figure 9:
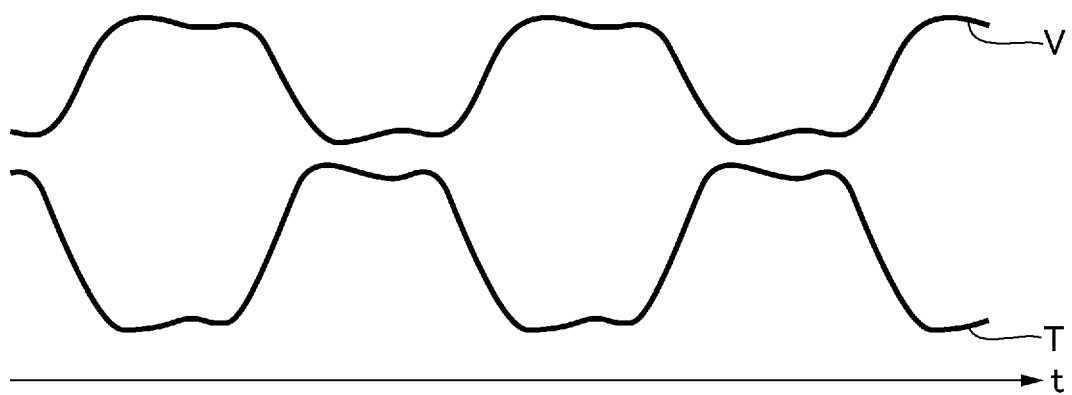
FIG. 9 shows an example of measurement of an output waveform of a Hall sensor and a vibration waveform of a moving part.

FIG. 9 shows an example of measurement of an output waveform V of the Hall sensor 72 and a vibration waveform T of the moving part 3. The output waveform V of the Hall sensor 72 is the waveform of a voltage value of the Hall sensor 72. The vibration waveform T of the moving part 3 is a waveform representing a displacement along the Z-axis of a predetermined site, that is, a site spaced apart from the swing axis J, of the moving part 3. The vibration waveform T shown in FIG. 9 is the waveform of a displacement along the Z-axis of a predetermined site of the holding frame 31 measured using a laser displacement meter. That is, the vibration waveform T shown in FIG. 9 is the vibration waveform T of the holding frame 31.

It can be seen from FIG. 9 that the output waveform V of the Hall sensor 72 is similar to the vibration waveform T of the moving part 3, that is, the holding frame 31. Therefore, the amplitude value of the output waveform V is a value representing the amplitude value of the moving part 3. A value resulting from converting a reference amplitude value into a voltage value is found in advance as a standard value V0, and whether an amplitude value V1 found from the output waveform V is higher than the standard value V0 or not is determined. Thus, whether the amplitude value of the moving part 3, that is, the holding frame 31, is higher than the reference amplitude value or not can be determined.

The drive signal processing circuit 121 has an amplifier 150 amplifying a reference signal SB, described later and shown in FIG. 10, and thus amplifies the reference signal SB and generates the drive signal DS. Therefore, in the feedback control, control to adjust the amplification factor, that is, an amplifier gain G, of the reference signal SB in the amplifier 150 is performed. That is, whether to decrease or increase the amplifier gain G is decided, based on the result of determining whether the amplitude value V1 is higher than the standard value V0 or not. At this time, in order to decide the amplifier gain G in consideration of the temperature characteristic of the magnetic sensor 7, the amplitude value V1 found from the output waveform V of the Hall sensor 72 is corrected, using the output, that is, the voltage value, from the thermistor 8.

Figure 10:
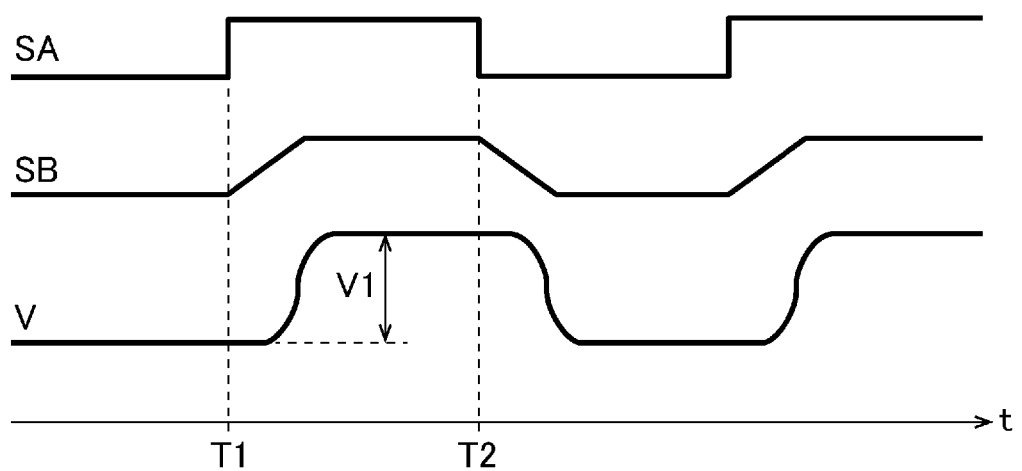
FIG. 10 is an explanatory view schematically showing a synchronization signal, a reference signal, and an output waveform of the Hall sensor.

FIG. 10 is an explanatory view schematically showing the synchronization signal SA, the reference signal SB, and the output waveform V of the Hall sensor 72. In this embodiment, the reference signal SB is a trapezoidal waveform, as shown in FIG. 10. Therefore, the drive signal DS resulting from amplifying the reference signal SB has a trapezoidal waveform, too. In the projector 1, when performing the optical path shifting operation to switch the optical path of the image light LL by the optical path shifting device 2 and display an image for a fixed time each at the image display positions P1, P2 shown in FIG. 2, the drive signal DS with a trapezoidal waveform is supplied to the actuator 6 and a current with a trapezoidal waveform flows through the coil 62.

Figure 11:
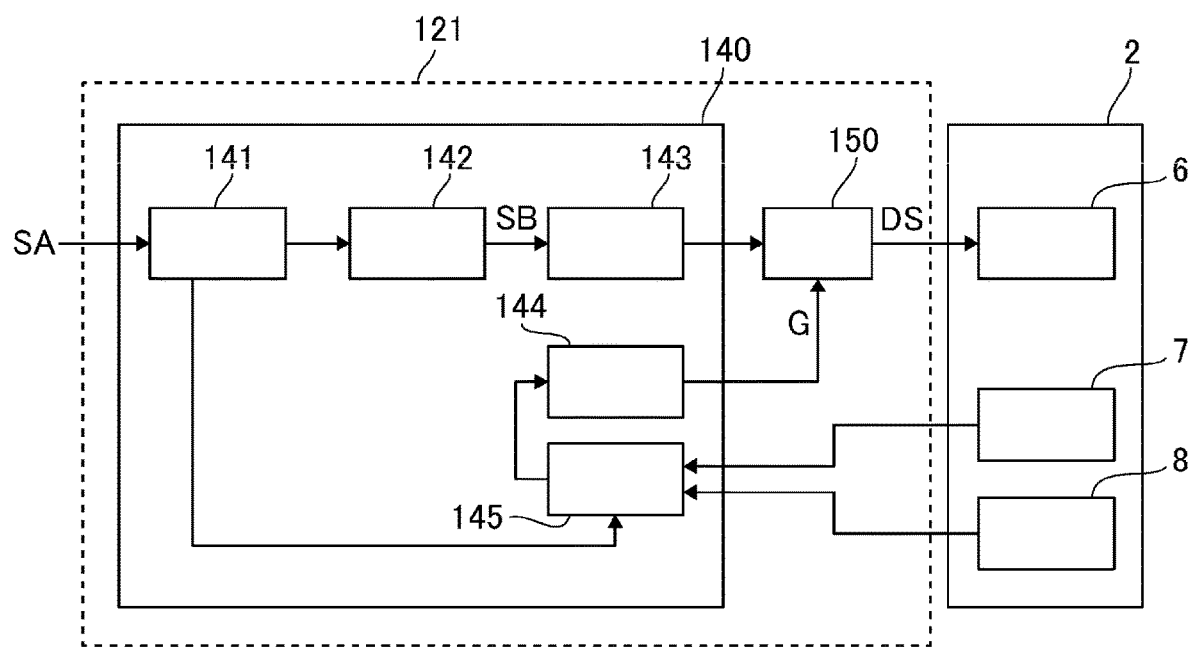
FIG. 11 is a functional block diagram of a signal processing circuit and the optical path shifting device.

FIG. 11 is a functional block diagram of the drive signal processing circuit 121 and the optical path shifting device 2. As shown in FIG. 11, the drive signal processing circuit 121 has a signal processing unit 140 and the amplifier 150. The signal processing unit 140 has a signal edge detection unit 141, a reference signal generation unit 142, a D/A conversion unit 143, a gain adjustment unit 144, and an A/D conversion unit 145. The functions of the signal processing unit 140 are implemented, for example, by a single-chip microcomputer having a ROM storing a program and a processor.

The signal processing unit 140 generates the trapezoidal reference signal SB shown in FIG. 10, based on the synchronization signal SA supplied from the image signal processing circuit 122. For example, the signal edge detection unit 141 detects a rising edge and a falling edge of the synchronization signal SA. As shown in FIG. 10, the reference signal generation unit 142 outputs the reference signal SB stored in advance, synchronously with a rise timing T1 and a fall timing T2 of the synchronization signal SA, based on an output from the signal edge detection unit 141. The D/A conversion unit 143 converts the reference signal SB into an analog voltage and outputs the analog voltage to the amplifier 150. The amplifier 150 amplifies the D/A-converted reference signal SB and thus generates an amplified signal. The amplified signal is the drive signal DS supplied to the actuator 6.

Gain Adjustment Processing

Figure 12:
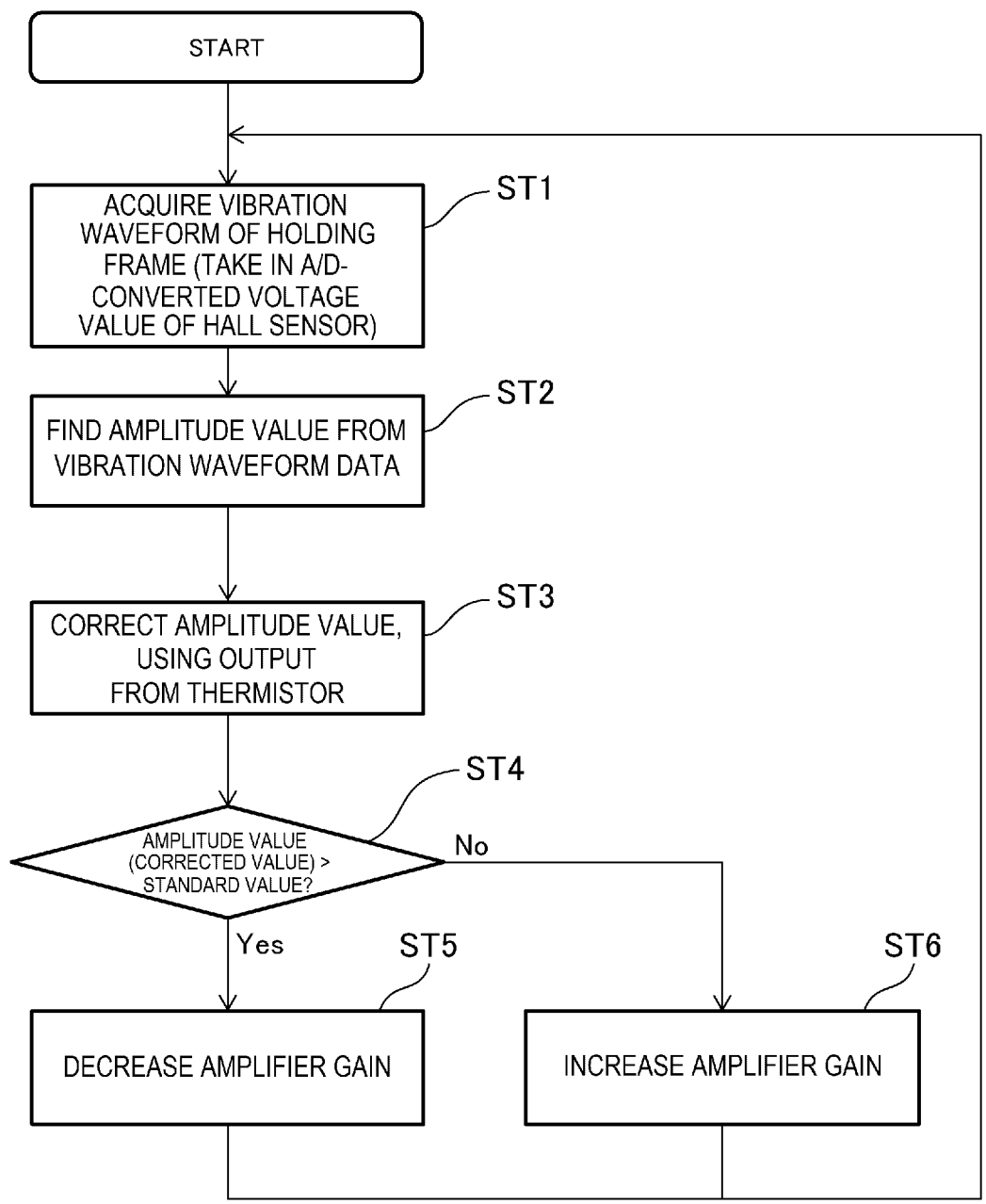
FIG. 12 is a flowchart of gain adjustment processing.

The signal processing unit 140 has the function of adjusting the amplification factor, that is, the amplifier gain G, of the reference signal SB when generating the drive signal DS. FIG. 12 is a flowchart of gain adjustment processing. The output from the magnetic sensor 7, that is, the voltage value of the Hall sensor 72, and the output or voltage value from the thermistor 8 provided in the optical path shifting device 2 are both converted into a digital value by the A/D conversion unit 145 and used for the gain adjustment processing.

First, in step ST1, the gain adjustment unit 144 takes in the digitally converted voltage value of the Hall sensor 72 from the A/D conversion unit 145. As described above, the waveform of the voltage value of the Hall sensor 72, that is, the output waveform V shown in FIG. 10, is a waveform corresponding to the vibration waveform of the holding frame 31. In the adjustment processing of the amplifier gain G, the output waveform V is handled as the vibration waveform of the holding frame 31, and the amplitude value V1 of the output waveform V is handled as the amplitude value of the holding frame 31. That is, step ST1 is the processing of acquiring the vibration waveform of the holding frame 31.

Next, in step ST2, based on the vibration waveform taken in step ST1, that is, based on the output waveform V, the amplitude value of the holding frame 31, that is, the amplitude value V1 of the output waveform V, is found. For example, the gain adjustment unit 144 finds the amplitude value V1 from the value of the output waveform V at a timing synchronized with the synchronization signal SA, based on the output from the signal edge detection unit 141. In this embodiment, the difference in the output value between the rise timing T1 of the synchronization signal SA and the fall timing T2 of the synchronization signal SA is calculated to find the amplitude value V1. Alternatively, a maximum value and a minimum value of the vibration waveform, that is, the output waveform V, acquired in step ST1 may be found, and the difference between the maximum value and the minimum value may be calculated to find the amplitude value V1.

Subsequently, in step ST3, the amplitude value V1 is corrected using the output from the thermistor 8. The magnetic sensor 7 has such a temperature characteristic that the magnetic flux generated by the magnet 73 changes according to temperature. In this embodiment, the temperature coefficient, which is a temperature characteristic value of the magnet, is used to correct the amplitude value V1. FIG. 13 is a table showing temperature characteristic values of magnets. FIG. 13 is a table showing a temperature coefficient (Br) and a temperature coefficient (Hcj) of a neodymium magnet, a samarium-cobalt magnet, a ferrite magnet, and an alnico magnet. The temperature coefficient (Br) is the rate of change per unit temperature of residual magnetic flux density Br. The temperature coefficient (Hcj) is the rate of change per unit temperature of coercivity Hcj. In step ST3, the amplitude value V1 is corrected, for example, using the difference between the temperature found from the output from the thermistor 8, that is, the temperature of the magnet 73, and a reference temperature, and the temperature characteristic value, and a corrected value V2 is thus calculated.

Next, in step ST4, whether the corrected value V2, that is, the corrected amplitude value, is higher than the standard value V0 or not is determined. As described above, the standard value V0 is a value resulting from converting the reference amplitude value into a voltage value. When the corrected value V2 is higher than the standard value V0, that is, the reference amplitude value (YES in step ST4), the processing goes to step ST5 and processing to decrease the amplifier gain G is performed. For example, the gain adjustment unit 144 calculates a new amplifier gain smaller than the current amplifier gain G, based on the difference between the corrected value V2 and the standard value V0. Meanwhile, when the corrected value V2 is lower than the standard value V0 (NO in step ST4), the processing goes to step ST6 and processing to increase the amplifier gain G is performed. For example, the gain adjustment unit 144 calculates a new amplifier gain G greater than the current amplifier gain G, based on the difference between the corrected value V2 and the standard value V0.

In steps ST5 and ST6, the new amplifier gain G is calculated and inputted to the amplifier 150. Consequently, the amplifier 150 generates the drive signal DS using the new amplifier gain G and supplies the generated drive signal DS to the actuator 6. The signal processing unit 140 performs the gain adjustment processing, for example, at a predetermined timing synchronized with the synchronization signal SA. This enables the actuator 6 to be controlled in such a way that the amplitude of the holding frame 31 is constant during the optical path shifting operation. Thus, the optical path of the image light LL can be changed with a constant amplitude.

Main Advantageous Effects of Embodiment

As described above, the optical path shifting device 2 in this embodiment has the glass plate 30 having a shape of a rectangular plate and on which incident light is incident, the holding frame 31 holding the glass plate 30, the support part 4 supporting the holding frame 31 in a swingable state, the actuator 6 causing the holding frame 31 to swing, and the magnetic sensor 7 detecting the position of the holding frame 31. This configuration enables monitoring of the actual amplitude of the holding frame 31 using the output from the magnetic sensor 7 and therefore enables feedback of the output from the magnetic sensor 7 to the drive control of the actuator 6. This can reduce the difference between the amplitude value of the holding frame 31 and the target value, that is, the reference amplitude value. Thus, the optical path shifting operation to shift the optical path of the incident light incident on the glass plate 30 can be accurately performed.

With such feedback control by monitoring the actual amplitude of the holding frame 31, the amplitude of the holding frame 31 can be maintained at a constant value and the amplitude of the glass plate 30 can be maintained at a constant value even when the environment of use, difference in attitude, deterioration with time and the like of the optical path shifting device 2 affect the operation of the holding frame 31. Thus, the stability of the optical path shifting operation can be increased.

The optical path shifting device 2 in this embodiment has the thermistor 8, which is a temperature detection unit detecting the temperature of the magnetic sensor 7. Therefore, when the magnetic sensor 7 has a temperature characteristic, the output from the magnetic sensor 7 can be corrected using the output from the thermistor 8. For example, when the magnetic sensor 7 has the Hall sensor 72 and the magnet 73, the magnet 73 has a temperature characteristic and therefore the amplitude value found from the output from the magnetic sensor 7 can be corrected using the output from the thermistor 8. This can eliminate the influence of the variation in the output from the magnetic sensor 7 due to temperature change. Thus, the drive signal DS can be adjusted more properly and the optical path shifting operation can be performed more accurately.

The control on the optical path shifting operation in the optical path shifting device 2 in this embodiment is performed by inputting the D/A-converted reference signal SB to the amplifier 150, amplifying the reference signal SB at the amplifier 150 to generate the drive signal DS, and supplying the drive signal DS outputted from the amplifier 150, to the actuator 6. In the generation of the drive signal DS, the following control is performed as the feedback control. First, a value corresponding to the amplitude value of the holding frame 31, that is, the amplitude value V1 of the output waveform V of the Hall sensor 72, is found from the output from the magnetic sensor 7. Then, the gain adjustment processing is performed, in which the corrected value V2 resulting from correcting the amplitude value V1 is found, using the output from the thermistor 8, and in which the amplifier gain G used to generate the drive signal DS is adjusted, based on the difference between the corrected value V2 and the standard value V0, that is, the value resulting from converting the reference amplitude value into the voltage value.

In this way, in the method for controlling the optical path shifting device 2 in this embodiment, the gain adjustment processing to find a proper amplifier gain G, eliminating the influence of the temperature characteristic of the magnetic sensor 7, is performed. Therefore, the drive signal DS with a proper amplitude can be supplied and the difference between the amplitude value of the holding frame 31 and the target value, that is, the reference amplitude value, can be reduced. Thus, the optical path shifting operation can be performed accurately.

The projector 1 in this embodiment is an image display device which has the optical path shifting device 2 arranged in the optical path of the image light LL and which drives the actuator 6 to shift the optical path of the image light LL with a constant amplitude. In the optical path shifting device 2, the glass plate 30, which is a light-transmissive substrate transmitting incident light, is held by the holding frame 31. Therefore, as the holding frame 31 swings, the angle of incidence of the incident light, that is, the image light LL, on the glass plate 30 is changed and the optical path of the image light LL is changed. This increases apparent pixels and therefore enhances the resolution of the image projected on the screen 101. Also, as described above, since the feedback control can be performed using the output from the magnetic sensor 7, the optical path can be shifted accurately. Thus, the image with the enhanced resolution can be displayed with a high image quality and the quality of the image can be enhanced.

In this embodiment, the projector 1 has the drive signal processing circuit 121 controlling the optical path shifting operation in the optical path shifting device 2. The drive signal processing circuit 121 has the amplifier 150 supplying the drive signal DS to the actuator 6, and the signal processing unit 140 supplying the D/A-converted reference signal SB to the amplifier 150. The signal processing unit 140 has the gain adjustment unit 144 adjusting the amplifier gain G used when generating the drive signal DS by amplifying the reference signal SB, based on the output from the magnetic sensor 7. Thus, a proper amplifier gain G can be found and therefore the drive signal DS with a proper amplitude can be supplied, as described above. The gain adjustment unit 144 also corrects the amplitude value V1 found from the output from the magnetic sensor 7, using the output from the thermistor 8, and adjusts the amplifier gain G, based on the corrected value V2. Thus, a proper amplifier gain G can be found, eliminating the influence of the temperature characteristic of the magnetic sensor 7.

In this embodiment, the magnetic sensor 7 has the Hall sensor 72 and the magnet 73. The magnet 73 is fixed to the holding frame 31. The Hall sensor 72 is fixed to the support part 4. Using the magnet 73 and the Hall sensor 72 in this way enables detection of the amount of displacement of the holding frame 31 in a contactless manner. Also, since the output from the Hall sensor 72 represents a change with time in the position of the holding frame 31, the amplitude value of the holding frame 31 can be easily found from the output from the Hall sensor 72. Moreover, since the Hall sensor 72 is provided on the fixed side instead of on the moving side, the wiring to the Hall sensor 72 need not be drawn around to the moving part 3. Thus, the wiring is easily laid out.

The magnetic sensor 7 in this embodiment has the sensor substrate 71, at which the Hall sensor 72 is provided. The thermistor 8 is provided at the sensor substrate 71. Installing the Hall sensor 72 and the thermistor 8 at the same substrate in this way can simplify the configuration. Also, since the temperature of the magnetic sensor 7 can be accurately detected, variation in the output from the magnetic sensor 7 due to the temperature characteristic can be accurately corrected.

Modification Examples

In the embodiment, the thermistor 8 is provided at the sensor substrate 71. However, the thermistor 8 may be fixed to another member. For example, the thermistor 8 may be fixed directly to the support part 4. Also, the Hall sensor 72 may be provided at one surface of the sensor substrate 71, and the thermistor 8 may be provided at the other surface. The thermistor 8 may be fixed to the holding frame 31 instead of the support part 4.

In the embodiment, the magnet 73 of the magnetic sensor 7 is fixed to the holding frame 31, and the sensor substrate 71 and the Hall sensor 72 are fixed to the support part 4. However, the arrangement of the magnet 73, and the sensor substrate 71 and the Hall sensor 72, may be reversed.

In the embodiment, a vibration actuator having the permanent magnet 61 and the coil 62 facing each other to generate a drive force based on the Lorentz force is used as the actuator 6. However, an actuator operating based on another principle may be used. For example, a piezo actuator may be employed.

What is claimed is:

1. An optical path shifting device comprising:
an optical member having a shape of a rectangular plate and on which incident light is incident;
a holding frame configured to hold the optical member;
a support part configured to support the holding frame in a swingable state;
an actuator configured to cause the holding frame to swing;
a magnetic sensor configured to detect a position of the holding frame; and
a temperature detection unit configured to detect a temperature of the magnetic sensor, wherein
the magnetic sensor has a Hall sensor and a magnet,
the magnet is fixed to the holding frame,
the Hall sensor is fixed to the support part,
the magnetic sensor has a sensor substrate at which the Hall sensor is provided, and
the temperature detection unit is provided at the sensor substrate.

2. An image display device comprising:
the optical path shifting device according to claim 1, arranged in an optical path of image light, wherein
the actuator is driven to change the optical path of the image light.

3. The image display device according to claim 2, further comprising:
an amplifier configured to supply a drive signal to the actuator; and
a signal processing unit configured to supply a reference signal to the amplifier, wherein
the signal processing unit has a gain adjustment unit configured to adjust an amplifier gain used to generate the drive signal, based on an output from the magnetic sensor.

4. The image display device according to claim 3, wherein
the gain adjustment unit is configured to correct an amplitude value of the holding frame found from the output from the magnetic sensor, based on a temperature of the magnetic sensor, and adjust the amplifier gain, based on a corrected value of the amplitude value.

5. A method for controlling an optical path shifting device comprising an optical member having a shape of a rectangular plate and on which incident light is incident; a holding frame configured to hold the optical member; a support part configured to support the holding frame in a swingable state; an actuator configured to cause the holding frame to swing; a magnetic sensor configured to detect a position of the holding frame; and a temperature detection unit configured to detect a temperature of the magnetic sensor, the method comprising:
- inputting a reference signal to an amplifier and supplying a drive signal outputted from the amplifier, to the actuator;
- correcting an amplitude value of the holding frame found from an output from the magnetic sensor, using an output from the temperature detection unit; and
- adjusting an amplifier gain used to generate the drive signal, based on a difference between a corrected value of the amplitude value and a reference amplitude value.

6. An optical path shifting device comprising:
- an optical member having a shape of a rectangular plate and on which incident light is incident;
- a holding frame configured to hold the optical member;
- a support part configured to support the holding frame in a swingable state;
- an actuator configured to cause the holding frame to swing;
- a magnetic sensor configured to detect a position of the holding frame;
- an amplifier configured to supply a drive signal to the actuator; and
- a signal processing unit configured to supply a reference signal to the amplifier, wherein
- the optical path shifting device is arranged in an optical path of image light,
- the actuator is driven to change the optical path of the image light, and
- the signal processing unit has a gain adjustment unit configured to adjust an amplifier gain used to generate the drive signal, based on an output from the magnetic sensor.

* * * * *